April 20, 1948.  T. R. DUNCAN  2,439,799
SALT SHAKER
Filed April 21, 1945
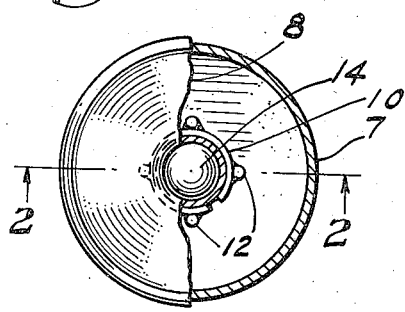
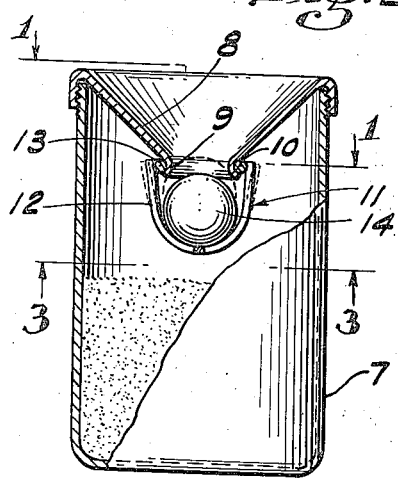
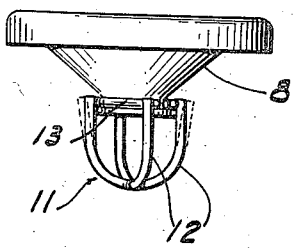
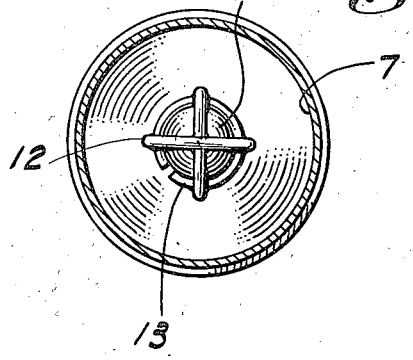
Theodore R. Duncan,
INVENTOR.
BY
ATTORNEY.

Patented Apr. 20, 1948

2,439,799

UNITED STATES PATENT OFFICE 2,439,799

SALT SHAKER

Theodore R. Duncan, North Hollywood, Calif.

Application April 21, 1945, Serial No. 589,494

3 Claims. (Cl. 65—57)

This invention relates to a shaker for granular material.

One object of the invention is to provide a salt shaker which can be filled without removing a closure member.

A more specific object relates to a salt shaker provided with a filling hopper-shaped end portion through which granular material may be introduced without removing the cover, in combination with a cage containing an oscillatory retarder located subjacent the mouth of the hopper which the material flows past when the device is maintained in a normal upstanding position and which in the dispensing position intermittently discharges small quantities of the material as the device is shaken.

Other objects, advantages and features of invention will hereinafter appear.

Referring to the drawing which illustrates what is deemed at present to be a preferred embodiment of the invention, Fig. 1 is a top plan view looking in the direction of the arrows 1—1 in Fig. 2.

Fig. 2 is a vertical section taken on line 2—2 of Fig. 1 with some parts shown in elevation.

Fig. 3 is a transverse section taken on line 3—3 of Fig. 2.

Fig. 4 is a side elevation of the hopper-shaped top and the attached cage.

Referring in detail to the drawing, the cylindrical container 7 is shown having a hopper-shaped cover 8 screwed onto one end thereof. Said cover is shown of the sheet metal type thus making it convenient to furnish its inner end with an outwardly directed lip 9 with a resultant external groove 10. Detachably fastened to the inner end of the hopper-shaped cover 8 is an approximately semicircular skeletal cage 11 which is shown as comprising two U-shaped intersecting wires 12 and a split annular wire 13 to which the ends of the U-shaped wires are secured, said split wire being arranged to spring into the groove 10 to detachably fasten the cage to the hopper.

Within the skeletal cage 11 is loosely contained a globular oscillatory retarding member 14. This globular retarder as well shown in Fig. 2, when seated upon the cage leaves unobstructed the open spaces between the four wires 12 throughout more than the upper half of the cage so that, when the device is positioned with its hopper portion directed upwardly, granular material may be filled speedily thereinto. When however the hopper end portion of the container is directed downwardly the globular retarder will gravitate to the dotted line position of Fig. 2. Therefore when the device is shaken in the latter position the ball 14 will intermittently open and close the inner end of the hopper element 8 causing the granular material to be dispensed in the desired retarded manner. Hence it will be obvious that upon the user giving the container the last shaking movement he may while maintaining it in the inverted position place it upon a supporting surface allowing the ball 14 augmented by the weight on the contents thereon to form an airtight seal which will prevent the admission of moist air to the contained salt or other granular material.

It should be understood that the present disclosure is for the purpose of illustration only and that this invention includes all modifications and equivalents which fall within the scope of the subject matter claimed.

What is claimed is:

1. In a device of the kind described, a container having a hopper-shaped end portion to feed granular material into the container during the filling thereof, an approximately semicircular skeletal cage having at one side a mouth portion externally surrounding and detachably connected with the inner end of said hopper-shaped portion, and a globular retarder oscillatably contained within said cage and of a size sufficiently large in diameter to prevent it from escaping through the inner end of said hopper.

2. A container having a sheet material wall portion which is so shaped as to provide a funnel shaped filling hopper directed toward the interior of the container, a closure member to close at times the inner end or mouth of said hopper, and means for floatably supporting said closure member in an inwardly spaced relation to said mouth of said hopper when the small end of the latter is directed downwardly, said closure member being positioned and shaped to gravitate against and close the hopper's mouth by fitting against the sheet material bordering said mouth when the container is inverted, the mouth portion of said hopper having an annular shoulder around it, said closure member supporting means normally resting upon said shoulder.

3. In a device of the kind described, a container having a hopper-shaped end portion to feed granular material into the container during the filling thereof, an approximately semicircular skeletal cage having at one side a mouth portion externally surrounding and detachably connected with the inner end of said hopper-shaped portion, and a globular retarder oscillatably contained within said cage and of a size sufficiently large in diameter to prevent it from escaping through the inner end of said hopper, said hopper portion having an external groove around its inner end and the mouth portion of said cage comprising an annular resilient portion springable into said groove to maintain the cage in its attached position.

THEODORE R. DUNCAN.

REFERENCES CITED

The following references are of record in the file of this patent:

UNITED STATES PATENTS

| Number | Name | Date |
|---|---|---|
| 968,890 | Sprinkle | Aug. 30, 1910 |
| 2,366,963 | Goldbert | Jan. 9, 1945 |
| 277,847 | Neef | May 15, 1883 |
| 2,035,256 | Ball | Mar. 24, 1936 |
| 1,265,607 | Carlisle | May 7, 1918 |
| 1,005,705 | Hanke | Oct. 10, 1911 |

FOREIGN PATENTS

| Number | Country | Date |
|---|---|---|
| 625,361 | Germany | Feb. 7, 1936 |